(12) United States Patent
Lippolis

(10) Patent No.: US 10,416,876 B2
(45) Date of Patent: *Sep. 17, 2019

(54) SYSTEM, METHOD AND APPARATUS FOR IMPLEMENTING AN IMPROVED USER INTERFACE ON A KIOSK

(75) Inventor: Francesco Lippolis, Vigevano (IT)

(73) Assignee: NCR Corporation, Atlanta, GA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/956,438

(22) Filed: Nov. 30, 2010

(65) Prior Publication Data

US 2012/0133595 A1 May 31, 2012

(51) Int. Cl.
*G06F 3/041* (2006.01)
*G06F 3/0488* (2013.01)

(52) U.S. Cl.
CPC ........ *G06F 3/04883* (2013.01); *G06F 2203/04808* (2013.01)

(58) Field of Classification Search
CPC ....... G06F 3/04883; G06F 2203/04808; G06F 3/0416; G06F 3/044; G06F 2203/04105; G06F 3/045
See application file for complete search history.

(56) References Cited

U.S. PATENT DOCUMENTS

| | | | | |
|---|---|---|---|---|
| 2004/0249727 | A1* | 12/2004 | Cook, Jr. | G06Q 10/10 705/26.81 |
| 2005/0253807 | A1* | 11/2005 | Hohmann et al. | 345/156 |
| 2008/0250348 | A1* | 10/2008 | Alimpich | G06F 3/0481 715/809 |
| 2011/0069018 | A1* | 3/2011 | Atkins | G06F 3/0416 345/173 |
| 2011/0291981 | A1* | 12/2011 | Yang | 345/174 |
| 2012/0133596 | A1* | 5/2012 | Lippolis | 345/173 |
| 2012/0136737 | A1* | 5/2012 | Lippolis | 705/23 |

* cited by examiner

*Primary Examiner* — Temesghen Ghebretinsae
(74) *Attorney, Agent, or Firm* — Schwegman, Lundberg & Woessner

(57) ABSTRACT

An apparatus, system and method are presented for implementing a user interface on a kiosk terminal. The terminal includes a processor, LCD display and touch-screen device. Software implemented by the processor receives input from the touch-screen device to determine complex interactions with the display that are then used to select and/or modify functions and features provided by the terminal.

23 Claims, 14 Drawing Sheets

Product Information

| DESCRIPTION | PRICE | QTY | EXT. PRICE | |
|---|---|---|---|---|
| ITEM 6<br>0049000634 | 9.99 | 1 | 9.99 | GIFT RECEIPT 123<br>SALE |
| ITEM 5<br>0049000634 | 3.99 | 1 | 3.99 | GIFT RECEIPT 123<br>SALE |
| ITEM 4<br>0049000634 | 5.98 | 1 | 5.98 | GIFT RECEIPT 123<br>SALE |
| ITEM 3<br>0049000634 | 1.99 | 2 | 3.98 | GIFT RECEIPT 123<br>SALE |
| | 2.97 | 1 | 2.97 | GIFT RECEIPT 123<br>SALE |
| | 4.81 | 1 | 4.81 | GIFT RECEIPT 123<br>SALE |

Super Soda (Grape)
24-Pack - 12 oz can
160 Calories per can
No artificial sweeteners

SUBTOTAL: $31.72
DISCOUNTS: $2.22
TAX: $2.22

TOTAL DUE: $29.50

← BACK

FIG. 2B

Article Sale

Scan article, key enter short code or select other functions.

| DESCRIPTION | PRICE | QTY | EXT. PRICE | |
|---|---|---|---|---|
| ITEM 15<br>0049000634 | 12.98 | 1 | 12.98 | GIFT RECEIPT 123<br>SALE |
| ITEM 14<br>0049000634 | 5.29 | 1 | 5.29 | GIFT RECEIPT 123<br>SALE |
| ITEM 13<br>0049000634 | 7.99 | 1 | 7.99 | GIFT RECEIPT 123<br>SALE |
| ITEM 12<br>0049000634 | 0.99 | 1 | 0.99 | GIFT RECEIPT 123<br>SALE |
| ITEM 11<br>0049000634 | 0.49 | 1 | 0.49 | GIFT RECEIPT 123<br>SALE |
| ITEM 10 | 19.98 | 1 | 19.98 | GIFT RECEIPT 123<br>SALE |

SUBTOTAL: $31.72
DISCOUNTS: $2.22
TAX: $2.22

TOTAL DUE: $29.50

BACK

FIG. 5B

SYSTEM, METHOD AND APPARATUS FOR IMPLEMENTING AN IMPROVED USER INTERFACE ON A KIOSK

FIELD OF THE INVENTION

The present invention relates generally to electronic kiosks. More particularly, the invention relates to an apparatus, system and method that reduces the time needed to perform a purchase transaction or other type of function on an electronic kiosk terminal.

BACKGROUND

In the retail industry, the largest expenditures are typically the cost of the goods sold followed closely by the cost of labor. With particular regard to retail industries, e.g., grocery or fast food service, the impetus to reduce labor costs has focused on reducing or eliminating the amount of time required to handle and process the items or goods purchased. To this end, there have been a number of concepts developed for point of sale (POS) terminals and kiosk terminals which attempt to substantially reduce the time required to process a transaction.

POS and kiosk terminals have problems associated with the level of customer experience with the terminals. In particular, a customer typically has little or no training in the operation of the terminal prior to his or her initial use of the terminal. Therefore, one concern that retailers have when evaluating a self-service POS or kiosk terminal is the terminals ability to detect the customer's experience level and provide the proper level of help or guidance.

In addition, both assisted and self-service POS terminals and kiosks often have inefficient user interfaces that slow down the checkout process by requiring numerous inputs from the user to perform a function. Some functions require using one or more drop down menus and require the user to know which menus contain the desired function. The additional inputs and required knowledge of the menus increases the time required to complete a transaction and increases the cost per transaction.

What is needed therefore is an assisted and self-service POS terminal and a kiosk terminal that provides a more intuitive human-computer interface and that further reduces the number of interactions needed to complete a transaction.

SUMMARY OF THE INVENTION

Among its several aspects, the present invention recognizes that a user interface on terminal, a kiosk or a retail terminal can require a user to perform simple or routine functions by using a time consuming menu driven human-computer interface. The menu driven interface slows down transactions and lacks the level of intuitiveness needed for untrained or infrequent users. The invention addresses these problems, as well as others, by providing a context based human-computer interface that uses touch characteristics captured by a touch screen to perform functions on the kiosk or retail terminal.

Instead of using multiple levels of drop down menus and popup windows to select a function and the target operated on by the function, the user performs a function with as little as one action by performing a touch to a location of the display where information involved in the function is displayed. The information being display at the location of the touch (the context of the touch) and the type of touch determines the function performed by the terminal. For example, a user can see additional information about an item being displayed by simply touching the displayed item's name.

The terminal processes touch data for each touch to determine behavior characteristics of the touch. The behavior characteristics are then used to determine a level of user confidence in the function being requested or a level of user experience with the function being requested. If either level is determined to be below a predefined level for the requested function, the user interface will respond by providing a predefined level of help e.g., requesting conformation before proceeding with the request. The terminal determines for each requested function, the user's level of confidence or experience for the function and provides the proper response. This improves the user's overall experience with the kiosk or retail terminal.

A more complete understanding of the present invention, as well as further features and advantages of the invention, will be apparent from the following Detailed Description and the accompanying Drawings.

BRIEF DESCRIPTION OF THE DRAWINGS

FIG. 2B is a drawing of a screen image depicting an action taken after a command requesting details about an item is entered.

FIG. 5B is a drawing of a screen image depicting an action taken after a scroll displayed items command is entered.

DETAILED DESCRIPTION

In the following description, numerous details are set forth to provide an understanding of the claimed invention. However, it will be understood by those skilled in the art that numerous variations or modifications from the described embodiments are possible. Throughout this specification, like element numbers are used to describe the same elements throughout the various drawing figures.

References within this specification to a kiosk or kiosks are references to an electronic kiosk terminal or terminals.

Figure 1A:
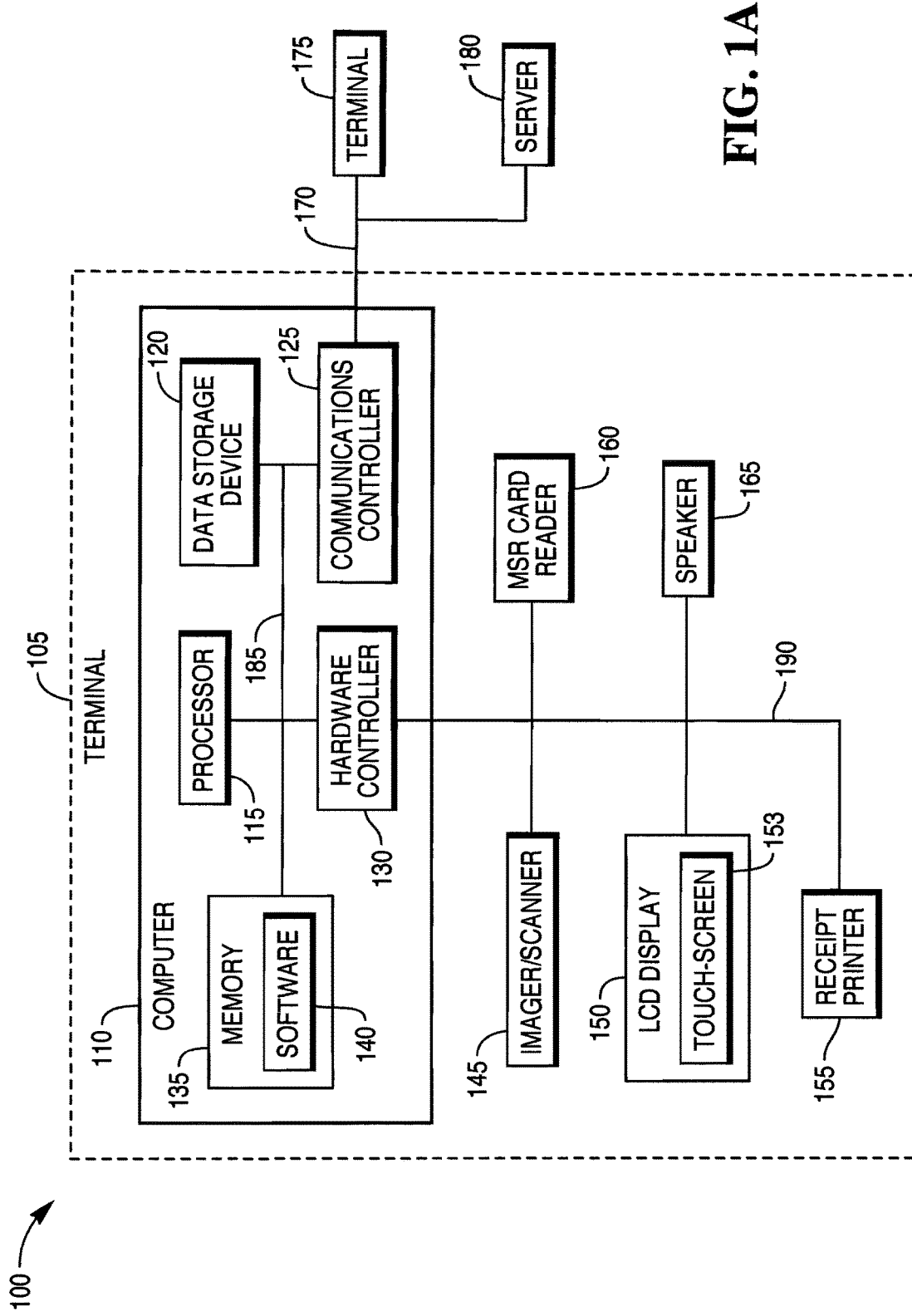
FIG. 1A is a high-level diagram illustrating an exemplar embodiment of a self-service terminal system.

Referring to FIG. 1, there is provided an exemplar embodiment of a self-service system 100. The self-service system 100 provides a number of features and functions, including the ability to purchase items or services and to retrieve and display information. The self-service system 100 includes a self-service point of sale terminal 105. The self-service terminal 105 generates a user interface that permits a user to purchase items or services. The terminal 105 comprises a computer 110 and peripherals attached to the computer 110. The peripherals include an imager/scanner 145, an LCD display 150, a receipt printer 155, a magnetic stripe reader (MSR) 160 and a speaker 165. The computer 110 includes a processor 115, a data storage device 120, a communications controller 125, a hardware controller 130 and memory 135. The elements communicate over a computer bus 185.

The data storage device 120 is a permanent or long-term computer readable storage device that stores computer software and data. The data storage device 120 is comprised of solid state memory devices (e.g., flash memory) or rotating memory (e.g., disk drives) or any other suitable device that provides for the non-volatile storing of computer software and data.

The communication controller 125 provides the hardware necessary to communicate with one or more data networks. The communication controller 125 can support multiple networks such as Ethernet 170, WIFI (not shown), wide area (not shown) and cellular based (not shown) networks. The terminal 105 uses the network 170 to communicate with one or more additional POS terminals 175 or servers 180 connected to the network 170. The terminal 105 can use different networks at the same time to communicate with different terminals 175 or servers 180. In some embodiments, the terminal 105 communicates with one or more of the servers outside the self-service system 100 using one or more of the supported multiple networks. The communications controller 125 implements the hardware and protocols required to implement each of these types of communications.

The hardware controller 130 generates the signals and interfaces need to communicate with the peripherals attached to the computer 110. The processor 115 interfaces with the hardware controller 130 to communicate with and where applicable control the operation of the attached peripherals.

The processor 115 executes software instructions and manipulates data. In some embodiments, the processor 115 includes local cache memory for storing cached instructions and or data. In some embodiments, the processor 115 includes bus control logic to control the operation of the computer bus 185. The bus control logic may be internal (on the same chip as the processor) or external (on a separate chip). In either case, they are considered to be part of the processor 115.

The memory 135 is a short term or volatile memory used to store computer software 140 and data. The computer software 140 includes instructions that are retrieved from the memory 135 by the processor 115 and executed. In some embodiments, the memory 135 includes a non-volatile memory component that includes start-of-day software executed by the processor 115. Start-of-day software, whether part of the memory 135 or not, when executed by the processor 115 causes, among other functions, some or all of the software 140 to be loaded from the storage device 120 into the volatile memory 135 and executed.

The processor 115, executing software 140, controls the components internal to the computer 110 and the peripherals attached to the computer 110 to implement the features and functions of the terminal 105. The software 140 includes multiple applications and system programs.

The software 140 can be loaded on to the storage device 120 from an external data storage device such as an optical disk, hard disk or portable device (e.g., a memory stick or a smart portable computing device). The software 140 can also be loaded on to the storage device 120 using an external data storage device that is located remote from the terminal 105 using a network interface supported by the communication controller 125.

Within this specification and unless otherwise stated, whenever an action, feature or function is attributed to the processor 115, the computer 110 or the terminal 105, it is understood that the action, feature or function is the result of the processor 115 of the computer 110 executing the software 140 stored in the memory 135 to produce the action, feature or function.

The imager/scanner 145 (also known as an item scanner) reads optical codes such as bar codes that appear on items presented to the terminal 105. These items include items for purchase, coupons for redemption or customer loyalty cards that use optical codes. In some embodiments, the imager/scanner 145 uses a laser to read the optical codes. In some embodiments, the image/scanner 145 uses an imager that captures an image of the optical codes and processes the image to read the optical code. In still other embodiments, the imager/scanner 145 includes both a laser and an imager to read the optical codes. In some embodiments, an RFID scanner is used to scan and identify RFID tags attached to items that are presented to the scanner 145.

In some embodiments, the imager/scanner 145 is not required e.g., when the terminal 105 is used as a kiosk or for order entry at a fast food location. In these embodiments, the imager/scanner 145 is optional and may not be included as a peripheral of the terminal 105.

The MSR 160 reads magnetic stripe information generally affixed to a card such as a credit or debit card, a customer's loyalty card or a driver's license. A pin pad maybe included with the MSR 160 to enter a pin number associated with a card. In some embodiments, the pin pad is created virtually on the LCD display 150.

The speaker 165 provides audio communications to a customer using the terminal 105. The audio communications can include both tones and verbal communications.

The LCD display 150 includes a touch-screen input device 153. The LCD display 150 communicates information to a user and receives user touch input information. The LCD display 150 displays both text and graphic information. The graphics include photos and video. The processor 115 sends information to the display 150 that is displayed and receives user touch information from the display 150.

The touch-screen input device 153 ("touch-screen") is affixed to the display surface of the LCD display 150. The touch-screen 153 generates a touch signal in response to being touched and communicates the touch signal to the processor 115. The touch signal includes raw touch position information that identifies the location on the touch-screen 153 that is touched. The touch signal continues to provide position information as long as there is contact with touch-screen 153 resulting from the touch. The touch may be stationary or the touch may move to different locations. The touch-screen 153 is a single touch input device. That is, the touch-screen 153 has the ability to determine the location of only a single simultaneous touch at one time to the touch-screen. In other embodiments, a multi-touch input device is used which has the ability to determine the location of a plurality of simultaneous touches to the touch-screen.

The touch-screen input device 153 is substantially transparent and affixed to the display surface of the LCD display 150. As such, the user touches the touch-screen 153 in response to information being displayed on the display 150. The processor 115 receives, from the touch-screen 153, location information identifying the location of a touch on the surface of the touch-screen 153. The processor 115 then determines a location on the display surface of the display 150 that corresponds to the location touched on the touch-screen 153. Once the location on the display surface is determined, the processor 115 determines what information is being displayed at or close to this location on the display 150. The information being displayed at the location is used to determine a context of the touch.

In some embodiments, the self-service system 100 includes a kiosk, which is used to enter an order for goods or services or to request information. The kiosk terminal has the same features and functions as the self-service POS terminal 105 except for those features and functions related to accepting physical payment.

In some embodiments, the self-service system 100 includes an assisted POS terminal. The assisted POS terminal has the same features and functions as the self-service POS terminal 105 except that it is operated by a trained operator instead of a customer. Typically, the operator is the owner of the self-service system 100 or employed by the owner of the self-service system 100. In still other embodiments, the self-service system 100 includes a hybrid terminal that has characteristic of all three terminals and can operate as either a kiosk or an assisted or self-service POS terminal.

Figure 1B:
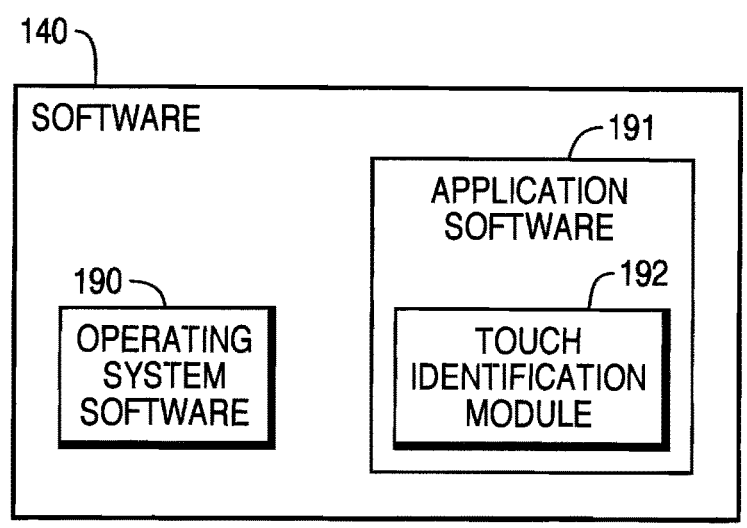
FIG. 1B is a high-level expanded view of a software element of the self-service terminal system.

FIG. 1B provides an expanded view of the software executed by the terminal 105. The software 140 stored in the memory 135 is organized into application software 191 and operating system software 190. Both types of software are executed by the processor 115 to implement the functions and features of the terminal 105. The application software 191 includes a touch identification module 192 that processes information received from the touch-screen input device 153 to determine the behavior characteristics and context of a touch made to the touch-screen input device 153. The software 140 includes multiple software applications that communicate with each other and with software running on other computers.

In some embodiments, the touch identification module 192 is implemented by a combination of software 191 and hardware.

The touch-screen input device (touch-screen) 153 provides a touch signal that includes touch position or location data describing the real-time position of a touch to the touch-screen 153. The touch-screen 153 provides continuous touch signals that update the real-time position of a touch on the touch-screen 153. If the touch moves to a different location on the touch-screen 153, the touch signals from the touch-screen 153 will reflect the new location of the touch. If the touch stays in contact with the same position, the touch signals from the touch-screen 153 will show the touch is still in progress but as not moved.

The processor 115 receives the touch signals including the position data from the touch-screen 153. Executing the touch identification module 192, the processor 115 uses the position data along with time data (captured as the position data is received from the touch-screen 153) to determine certain characteristics of the touch. Touch characteristics are based on the behavior of a touch as the touch interacts with the touch-screen 153. The characteristics include the starting point of the touch, the ending point of the touch, direction, path of the touch, length of path, duration of the touch, velocity of the movement, type of touch and others. If a touch does not move to a different location, characteristics that involve movement such as direction or velocity will be set to zero or to a setting that signifies the touch did not move. The path of the touch characteristic for a touch that moves includes each different location of the touch as the touch moves and time data associated with each location. With this information, the processor 115 determines changes in touch velocity during the movement of the touch. The changes in touch velocity during the movement of the touch are used in part to determine a level of confidence associated with the touch.

The touch identification module 192 also determines a touch type. The types of touch include a simple touch action and a complex touch action. A simple touch action includes a single or double touch to the touch-screen 153. These touch actions do not involve movement of the touch. A complex touch action includes a touch to the touch-screen 153 followed by movement of the touch to a different location on the touch-screen 153, all while maintaining contact with the touch-screen 153.

Some touch-screens 153 are very sensitive. As a result, a touch-screen 153 can report a small movement for a touch when the touch was intended to be a simple touch without movement. The touch identification module 192 has touch movement thresholds used to identify touch movement. If the movement of a touch is below the movement threshold, the touch is determined to be a simple touch action. If the movement of a touch is above the movement threshold, the touch is determined to be a complex touch action. The movement threshold is a changeable parameter and can be tailored to the type of touch-screen 153 in use.

Some touch actions can not be identified until a fixed period of time has pasted after the initial touch is made. For these touch actions, the period of time will extend beyond the end or lifting of the initial touch from the touch-screen 153. Such touch actions include a single or a double touch. Because a double touch consists of two single touches separated by a time interval but both occurring during a fixed period of time, the processor 115 has to wait for a period of time after a first single touch is complete before the processor 115 can determine if the touch was a single or double touch. If no additional touch occurs during the period of time, the action was a single touch. If an additional touch occurs during the period of time to the same location, the action was a double touch.

The terminal 105 supports a user interface with a plurality of complex touch actions. Each complex touch action exhibits certain behavior characteristics that are identified. These behavior characteristics are determined to be either primary or secondary characteristics of the touch behavior. Primary characteristics are used, in part, to determine what command or function is being requested by the user. Once the requested command or function is identified, any secondary characteristics are assigned to dynamic variables of the complex touch action and are used to determine the terminals 105 response to the touch. It should be noted that some characteristics can appear in both primary and secondary characteristics. The direction of a touch can be used as both a primary and secondary characteristic.

For example, if multiple touches exhibit a similar horizontal type of touch movement in the same context, they are mapped to the same complex touch action. In this example, differences in the velocity of the touch movement are considered secondary characteristics and not used to map the touch to a complex touch action. As a secondary characteristic, the differences in touch movement velocity would not change the mapping of the touch behavior to a specific complex touch action. However, the software 191 that generates a response to the identified specific complex touch action will use the velocity of the touch movement to determine the response to the touch action. Both context sensitivity and secondary characteristics can cause the software 191 to generate a different response to the same complex touch action entered on the touch-screen 153.

Some touch actions can be identified before a user has completed entering the touch action on the touch-screen 153. These touch actions involve movement of the touch. The processor 115 receives continuous touch information from the touch-screen 153 as a touch occurs. The touch identification module 192 determines the characteristics of the touch based on the received touch information and can determine certain primary characteristics of the touch prior to completion of the touch. At the same time, the touch identification module 192 also determines the context of the touch. Determining the context for a touch action includes identifying the features or functions that are available in the area of the display 150 where the touch action occurred or is occurring.

Once at least the primary characteristics and context of the touch are determined, the touch identification module 192 uses the information to determine which command or function has been requested or is being requested on the touch-screen 153. The touch identification module 192 identifies the proper application software 191 responsible for processing the requested command or function and transfers primary and secondary information about the touch to the identified software 191 which generates a response. If the touch action is still in progress, the touch identification module 192 will continue to update the primary and secondary information allowing the identified software 191 to continue or modify its response.

Because touch actions are context sensitive, the terminal's 105 response to the same touch action depends on what information is being displayed in the area of the display 150 where the touch occurs. In addition, certain secondary characteristics of the touch will cause the terminal 105 to generate a different response.

In cases where a response to a complex touch action results in movement of displayed data on the display 150, the different response is a change in the speed that displayed data is moved on the display 150 (e.g., scrolling items at a different speed). In some cases, the different response results in a completely different initial response. For example, entering a command to void an item involves a single touch with movement across the item to be voided. If the touch movement is slow or the touch velocity is inconsistent, this represents either a user's lack of confidence in requesting the action or a lack of experience with entering the complex touch action to request a void action. Either situation causes the terminal 105 to change the normal response to a void command and to provide some level of help to the user such as requesting that the user confirm the request to void an item. However, a movement with a fast consistent velocity would represent confidence and/or experience and cause the terminal 105 void the requested item without any further interaction with the user. The terminal 105 can determine different levels of help based on behavior characteristics of each touch and different commands or functions will generate different responses based the level of help for each request.

Furthermore, an extremely fast touch velocity is determined to be an accidentally touch and ignored. Different functions can have different settings that are used to determine an accidentally touch.

The ability to detect and use secondary touch behavior characteristics allows the terminal 105 to, among other things, determine the level of help a user needs for each interaction (i.e., command or function) with the terminal 105 and provide a response tailored to each interaction and to the user's level of confidence and/or experience for that interaction. This provides the optimal speed during a transaction with the terminal 105 while still providing the appropriate level of help or training for each interaction. These and other features will be discussed in more detail below.

Figure 2A:
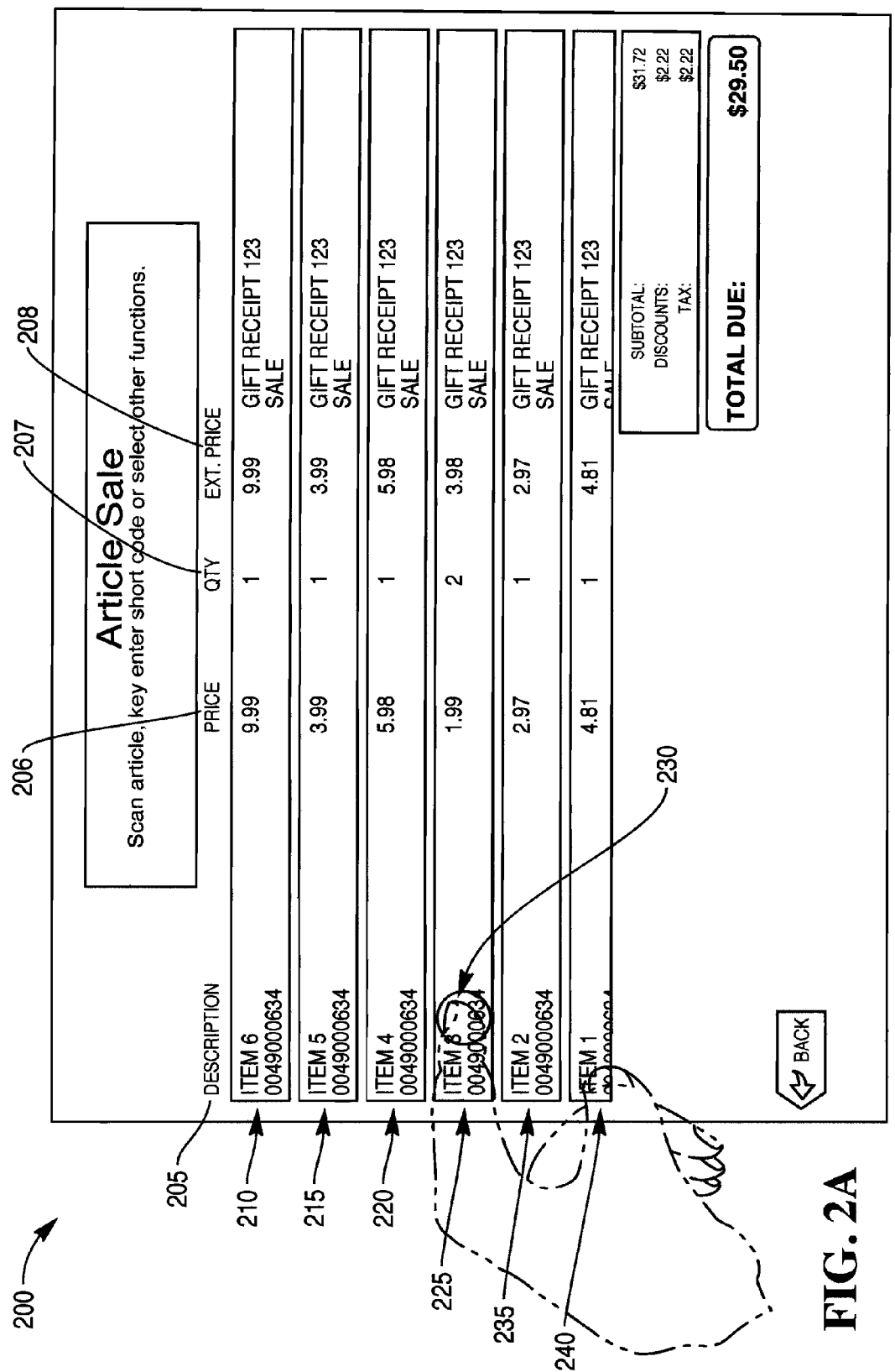
FIG. 2A is a drawing of a screen image depicting the entry of a command requesting details about an item.

Turning to FIG. 2A, there is provided a drawing of a screen image 200 from the display 150 depicting the entry of a command requesting details about an item. The terminal 105 is processing a purchase transaction and the drawing depicts the entry of a command requesting additional details about an item that has been entered as part of the transaction. The transaction includes entering a number of items for purchase. Six of these items 210, 215, 220, 225, 235, 240 are depicted on the display 150 of the terminal 105. The items are entered into the transaction by a user either using the imager/scanner 145 to read RFID tag or scan a bar code attached to or printed on each item or by the user entering a code or identifier for the items or by the user selecting the items from a list of items displayed on the display 150, or a combination thereof. The terminal 105 displays on the display 150 information about each item including a short description 205 of the item, a unit price 206, a quantity 207 and the extended or total price 208 of the item (unit price 206 multiplied by the quantity 207). The user elects to see more details about an item 225 by touching an area 230 of the display 150 where the short description of the item 225 is displayed. A single touch to the area 230 causes the terminal 105 to identify that a command requesting additional details about item 225 has been made.

Turning to FIG. 2B, there is provided a drawing of a screen image 250 from the display 150 depicting an action taken after a command requesting details about an item is entered. In response to the command requesting details about the item 225, the terminal 105 highlights the item's 225 description field 205 and opens a window 255 near the highlighted description field 205. The window 255 is positioned so as to not obscure the description field 205 or other fields for the item 225. In response to the command requesting details, the terminal 105 displays additional detailed information about the item in the window 255. The information may include a longer more descriptive name for the item 255, size and package information, ingredient list, warnings, calorie information or sales promotions. This area can also be used to show the item is age restricted meaning age verification is required prior to completing the purchase.

When the user is finished viewing the additional information, the user closes the window 255 with a single touch inside the window 255. The user can move the window 255 to another location by touching an area inside the window 255 and while maintaining the single touch, moving the touch to another location on the display 150. This causes the computer 110 to move the window 255 with the movement of the touch instead of closing the window 255. Because the computer 110 determines that the touch had movement rather than being a single touch, the window 255 is moved to a new position instead of being closed.

FIGS. 2A and 2B illustrate one type of context sensitivity. The six items 210, 215, 220, 225, 235, 240 are displayed in the order the items were presented to the terminal 105 and entered into the transaction. The display location of each item on the display 150 is not fixed. Information about any one item on the display 150 can be scrolled so that one or more of the 6 items 210, 215, 220, 225, 235, 240 are scrolled off the display 150 and therefore are not visible. The remaining items while visible would move to a new location on the display 150. For the items still visible on the display 150, touching the item's description field 205 will cause the terminal 105 to determine a context for the touch with the touch information then determine that the user is requesting to see more details about the item touched 230. Touching other non-item related areas of the screen will not cause the terminal 105 to determine that the user is requesting to see more details about an item. Touching other areas will either do nothing or select other features or functions implemented by the terminal 105. This example demonstrates how the context of a touch is used to determine what action, if any, is taken by the terminal 105

Figure 3A:
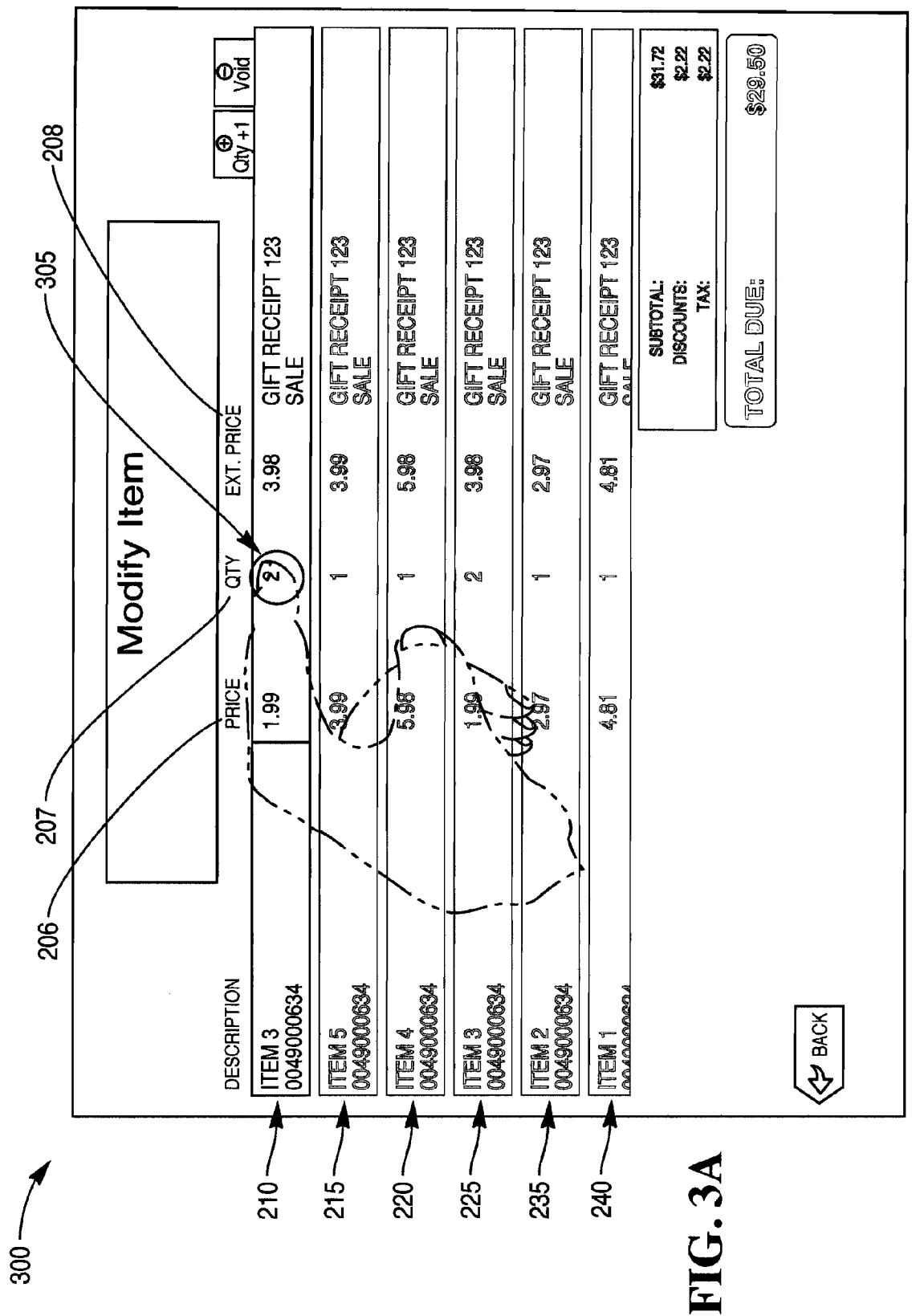
FIG. 3A is a drawing of a screen image depicting the entry of a command requesting to modify the quantity of an item for purchase.

Turning to FIG. 3A, there is provided a drawing of a screen image 300 from the display 150 depicting the entry of a command requesting to modify the quantity of an item for purchase. The terminal 105 is processing a purchase transaction and the drawing depicts the entry of a command requesting to modify the quantity of the item 210 that has been entered during the transaction. The transaction includes entering a number of items for purchase. Six of these items 210, 215, 220, 225, 235, 240 are depicted on the display 150 of the terminal 105. The items are entered into the terminal 105 by a user either by scanning a bar code or RFID tag attached to or printed on each item or by the user entering a code or identifier for the items or by the user selecting the items from a list of items displayed on the terminal 105, or a combination thereof. The terminal 105 displays on the display 150 information about each item including a short description 205 of the item, a unit price 206, a quantity 207 and the extended or total price 208 of the item (unit price 206 multiplied by the quantity 207).

A number of fields used to describe an item for purchase can be modified. One such field is the quantity field 207 which describes how many identical items are being purchased. A user can elect to change the quantity for an item being purchased by a single touch to an area 305 of the display 150 where the quantity of the item 210 is displayed. When the terminal 105 determines that a single touch has been made, it further determines the context of the area touched 305 and in this example executes a modify quantity command for the item 210.

Figure 3B:
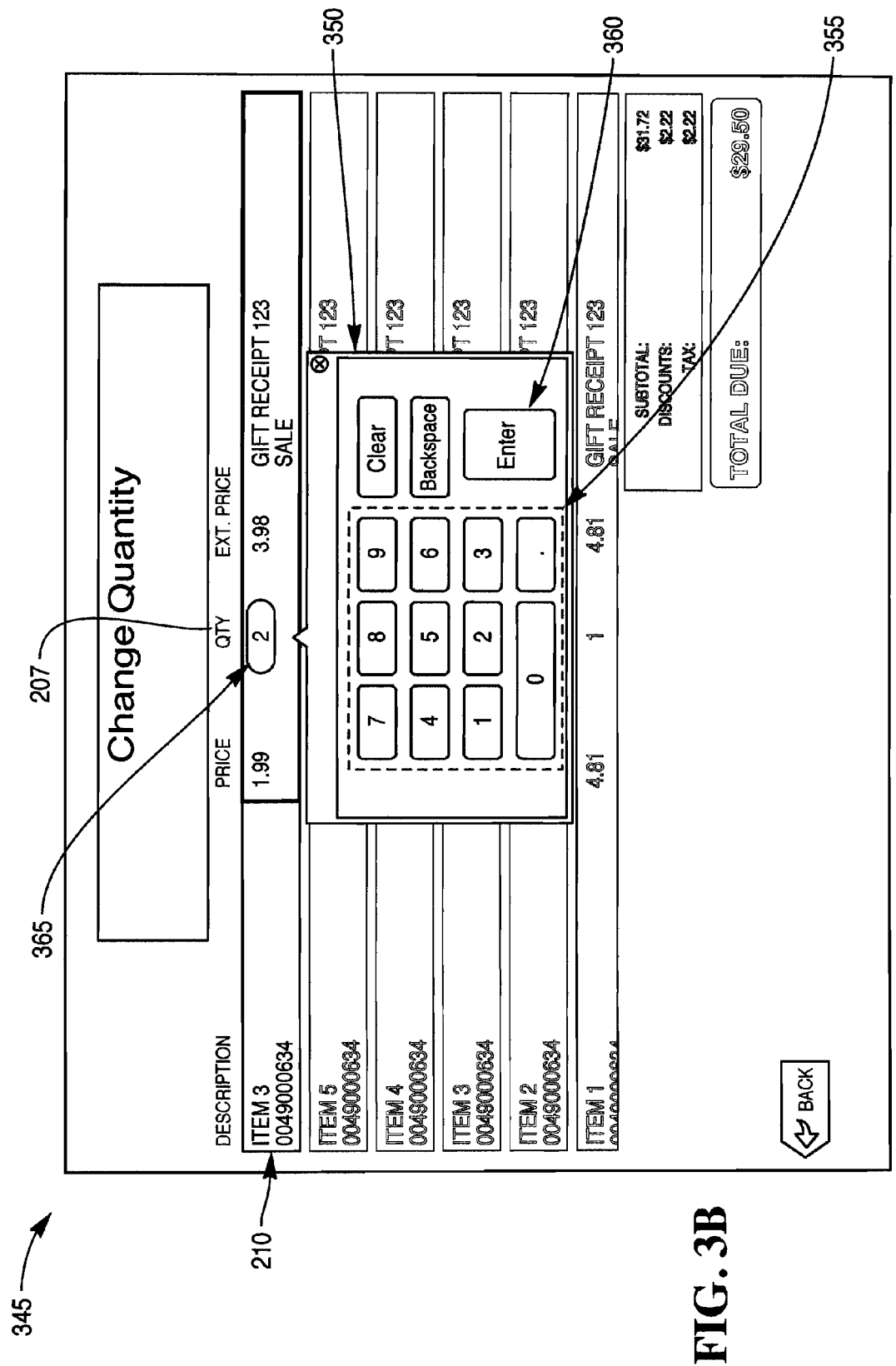
FIG. 3B is a drawing of a screen image depicting an action taken after a command to modify the purchase quantity for an item is entered.

Turning to FIG. 3B, there is provided a drawing of a screen image 345 from the display 150 depicting an action taken after a command to modify the purchase quantity for an item is entered. In response to the command to modify the item 210, the terminal 105 highlights the item's 210 quantity field 365 and opens a window 350 near the highlighted quantity field 365. The window 350 is positioned so as not to obscure the quantity field 365 or other fields for the item 210. In response to the request to modify the quantity field 365, the terminal 105 displays in the window 350 a virtual key pad 355. The virtual key pad 355 includes virtual buttons, each assigned a number from 0 to 9. The user selects a new quantity by selecting one or more of the numbers using a single touch to the corresponding number's button. In this example, the virtual key pad 355 also includes command buttons such as Clear, Restore and Enter 360 which control the operation of the virtual key pad 355. Once the user selects a new quantity number, selecting the Enter button 360 causes the terminal 105 to store the new quantity as the quantity 365 for the item 210 and to remove the window 350 from the display 150.

FIGS. 3A and 3B illustrate another example of the type of context sensitivity described for FIGS. 2A and 2B.

Figure 4A:
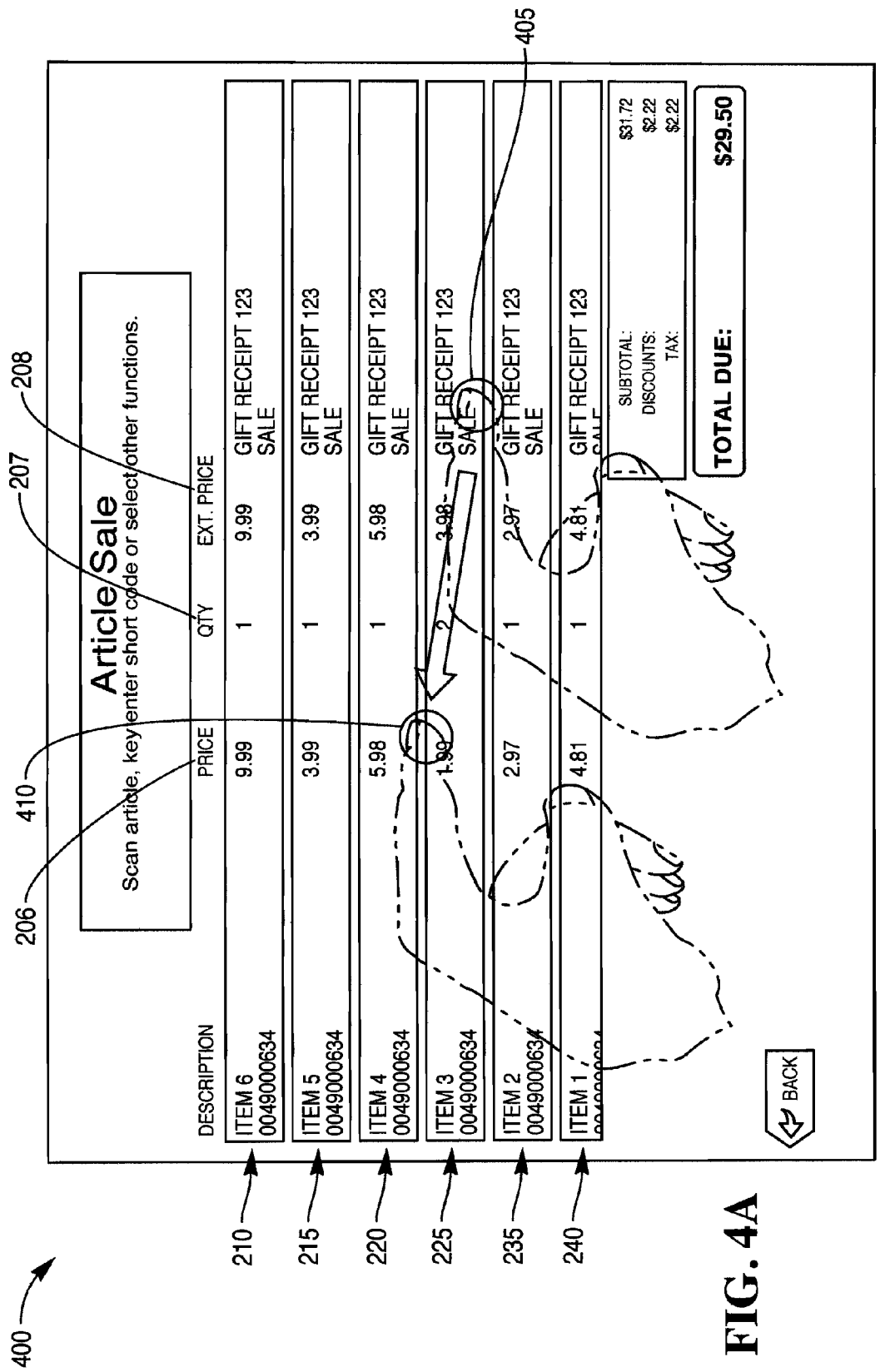
FIG. 4A is a drawing of a screen image depicting the entry of a command requesting to void an item entered for purchase.

Turning to FIG. 4A, there is provided a drawing of a screen image 400 from the display 150 depicting the entry of a command requesting to void an item entered for purchase. The terminal 105 is processing a purchase transaction and the drawing depicts the entry of a command requesting to void (also known as deleting) an item 225 that has been entered during the transaction. The transaction includes entering a number of items for purchase. Six of these items 210, 215, 220, 225, 235, 240 are depicted on the display 150 of the terminal 105. The items are entered into the transaction by a user either using the imager/scanner 145 to scan a bar code or RFID tag attached to or printed on each item or by the user entering a code or identifier for the items or by the user selecting the items from a list of items displayed on the display 150, or a combination thereof. The terminal 105 displays information on the display 150 about each item including a short description 205 of the item, a unit price 206, a quantity 207 and the extended or total price 208 of the item (unit price 206 multiplied by the quantity 207).

The void item command removes an item from the purchase transaction being performed on the terminal 105. The user enters the void item command by touching an area 405 of the display 150 where some portion of the item 225 is displayed. While still touching the display 150, the user moves the touch 405 to the left and upward across a portion of the displayed information for an item 225 and lifts the touch at point 410 located at the top edge of the item 225. The terminal 105 determines that a command to void the item 225 is being requested because the touch moves in a specific manner across information displayed for the item 225.

The touch action used to request a void command is a complex touch action. It involves an initial touch to a point 405 on the display 150 followed by, and while still maintaining contact with the display 150, sliding the touch across the display 150 to a point 410 that is upward and to the left of the initial touch point 405. The terminal 105 determines a starting and ending point on the display 150 for the complex touch action. In addition, the terminal 105 determines the velocity of the touch as it moves on the display 150. The starting and ending points of the touch are primary characteristics of the touch and the velocity of the touch is a secondary characteristic.

It should be noted that the user may begin and end the complex touch action at any location on the display 150 where the item 225 is displayed as long as there is space for the touch to move upward and to the left. In some embodiments, the terminal 105 will recognize an upward movement to the right or a downward movement to the right or left as a request to void an item if the movements occur over an area where information for the item is being displayed. A person of ordinary skill will appreciate that the terminal 105 can be programmed to correlate different complete touches to the same command or function.

Figure 4B:
FIG. 4B is a drawing of a screen image depicting an action taken after a command to void an item is entered.

Turning to FIG. 4B, there is provided a drawing of a screen image 450 from the display 150 depicting an action taken after a command to void an item is entered. In response to a user entering the command to void an item 225, the terminal 105 marks the item 225 as deleted by placing two horizontal lines 455 across the information being displayed for the item 225. The terminal 105 further removes the item 225 from the purchase transaction. In some embodiments, all information about the item 225 is removed from the display 150.

In some embodiments, the terminal 105 uses certain primary and secondary characteristics of the complex touch action to indicate a user's a level of confidence or experience in requesting that the item 225 be voided. The user may be unsure how to execute the complex touch action or may not be sure they really want to void the item 225. Either of these conditions can cause the touch velocity to be slow or erratic. The terminal 105 by using characteristics of the complex touch action determines that at least one of these conditions exists and changes the behavior of the void command. Instead of automatically voiding the item, the terminal 105 first displays a window and asks the user to confirm they really want to void the item. If the user confirms the request, the terminal 105 precedes with the action to void the item 225. If the user does not confirm the request, the void command ends without voiding the item.

The terminal 105 uses characteristics of the complex touch action to determine the level of confidence a user has for each requested command. The level of confidence may correlate to the level of training a user has. When a low level of user training is determined, the terminal 105 provides additional training or help to the user. While the additional help slows down the transaction, it provides training the user may need. As the user obtains more experience and increases their level of confidence, as indicated by the characteristics of each complex touch action, the terminal 105 stops or reduces the additional level of help provided. Because a level of confidence is determined for each complex touch action made by the user, the terminal 105 only provides additional help for those complex touch actions where the level of confidence is below a certain threshold. This threshold can be changed as needed by system administrators.

For example, when the terminal 105 is first installed, the level of confidence threshold can be set higher because most users will not be familiar with the user interface and will need extra help. Once most users have become familiar with the terminal 105, the threshold can be lowered to speed up the transaction process as users become proficient using the terminals 105. The terminal 105 can generate multiple levels of help where each level provides additional or more detailed information. The level of confidence determines the level of help to provide.

The complex touch action used to request the voiding of an item illustrates another type of context sensitivity. The action of this command involves moving a touch at an angle on the display 150 across multiple fields of the same item on the display 150. Instead of selecting a field for modification, the terminal 105 determines that a void command is being requested for the item 225 being displayed in the area where the touch occurs.

Figure 5A:
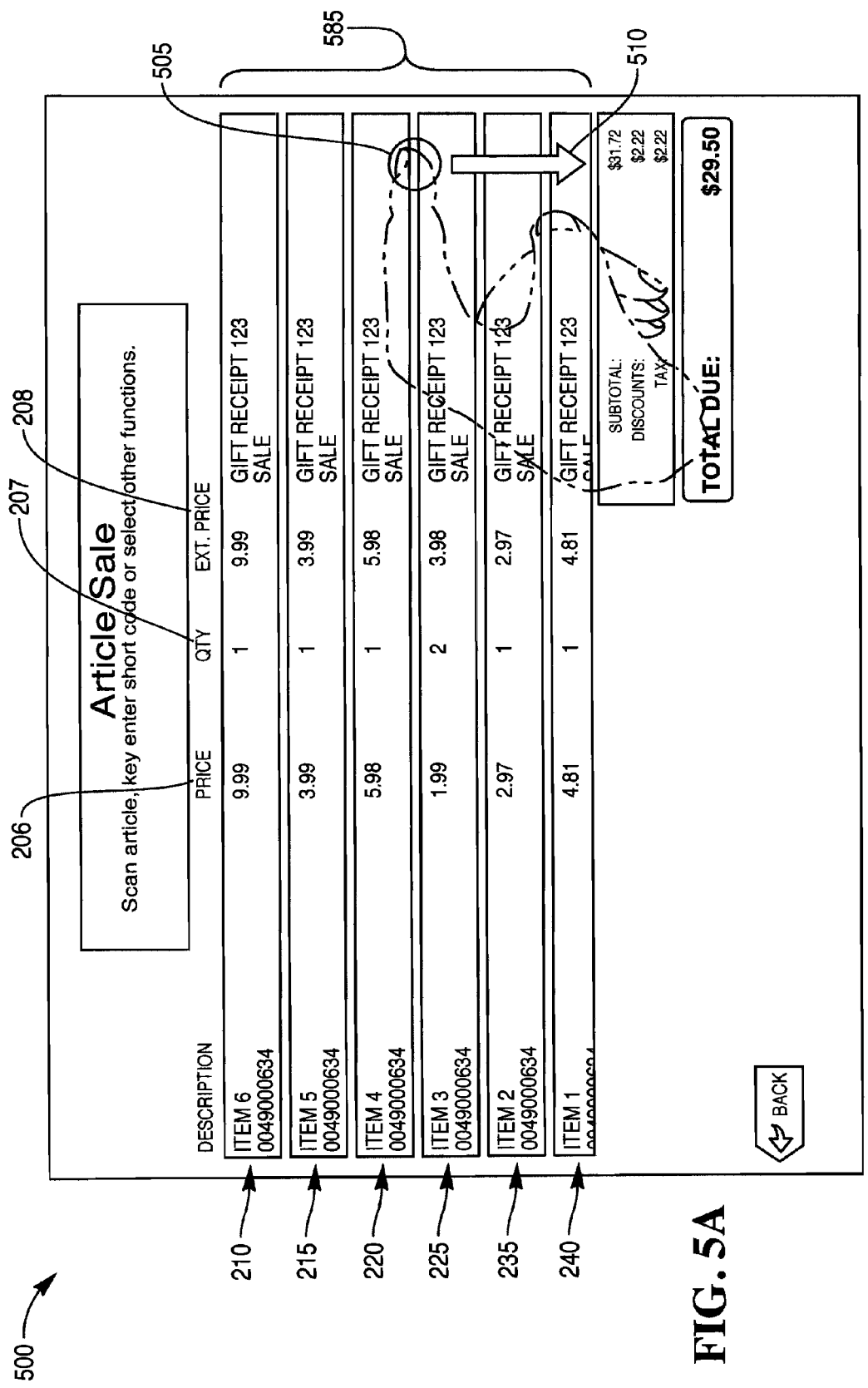
FIG. 5A is a drawing of a screen image depicting the entry of a command to scroll displayed items.

FIG. 5A provides a drawing of a screen image 500 from the display 150 depicting the entry of a command to scroll items. The terminal 105 is processing a purchase transaction and the drawing depicts the entry of a command requesting to scroll items displayed on the display 150. The transaction includes entering a number of items for purchase. Six of these items 210, 215, 220, 225, 235, 240 are depicted on the display 150 of the terminal 105 in an item display area 585. The items are entered into the transaction by a user either using the imager/scanner 145 to scan a bar code or RFID tag attached to or printed on each item or by the user entering a code or identifier for the items or by the user selecting the items from a list of items displayed on the display 150, or a combination thereof. The terminal 105 displays information about each item including a short description 205 of the item, a unit price 206, a quantity 207 and the extended or total price 208 of the item (unit price 206 multiplied by the quantity 207).

A complex touch action is used to request a scroll item command. The action involves an initial touch to a location 505 in an item touch area 585 followed by moving the touch while still maintaining contact with the display 150. The movement of the touch is generally vertical either in the upward or downward direction. In this example, the movement of the touch is downward 510. The terminal 105 determines a starting and ending point on the display 150 for the complex touch action. In addition, the terminal 105 determines other characteristics of the complex touch action, including the velocity of the touch as it moves between the staring and ending point. The starting and ending points of the touch are primary characteristics of the touch and the velocity of the touch is a secondary characteristic.

FIG. 5B provides a drawing of a screen image 550 from the display 150 depicting an action taken after a scroll items command is entered. In this example, the terminal 105 moves or scrolls the items being displayed in the item display area 585 downward so that the items appearing at the bottom of the item display area 585 are removed from the display 150 as they reach the bottom edge of the item display area 585. As items are removed from the bottom of the item display area 585, other items that are part of the transaction are added to the top of the item display area 585, which makes them visible. Had the touch movement direction been upward, the items would be removed from the top of the item display area 585 and new items added at the bottom of the item display area 585.

In this example, after the items are scrolled as a result of a scroll command, the original six items 210, 215, 220, 225, 235, 240 (see FIG. 5A) are moved off the display and six new items 550, 555, 560, 565, 570, 575, 580 are displayed in their place.

A scroll bar 590 is displayed on the far right side of the item display area 585. The scroll bar 590 indicates what portion of the total number of items is being currently displayed. In some embodiments, the scroll bar 590 is only displayed for a short period of time after a scroll item command is entered. When the short period of time expires, the terminal 105 removes the scroll bar 590 from the display 150.

In some embodiments, the terminal 105 will begin scrolling items on the display 150 before the scroll item command is complete and can continue scrolling items after the scroll item command has completed. The scroll item command begins with an initial touch to the item display area 585 and continues as the touch moves on the display 150. The scroll item command is complete when the touch is lifted from the display 150 or the touch moves beyond the item display area 585. While the scroll item command is complete when the touch is lifted, the terminals 105 response to the command may start before the command is complete and the response may continue after the command is complete.

The terminal 105 determines that a scroll item command has been entered once the initial touch 505 to the item display area 585 is made and a vertical movement over several items is determined. These are primary characteristic of the touch. The terminal 105 uses the primary characteristics to determine that a scroll item command is being requested. The terminal 105 begins scrolling the displayed items while the touch is still moving on the display 150. The terminal 105 will identify the item under or closest to the touch 505 along with the velocity and direction of the touch movement. The terminal 105 will then scroll the items being displayed so that the item under or near the touch remains in approximately the same relative position to the location of the touch, as the touch moves.

If the velocity of the touch movement is high, the terminal 105 may not be able to scroll the displayed items at the same velocity of the touch movement or for ergonomic reasons the terminal 105 may limit the scroll speed to a maximum speed. In these cases, the terminal 105 will continue to scroll the items in the item display area 585 after the touch is lifted until the item identified to be under or closest to the initial touch location 505 is positioned at the location where the touch was lifted from the display 150.

In the case where a touch moves beyond the borders of the item display area 585, the terminal 105 will continue to scroll the items for a short period of time after the touch moves beyond the borders of the item display area 585. The items will scroll at either the speed of the touch or at the maximum scroll speed whichever is slower. The terminal 105 will reduce the item scroll speed to zero over a short period of time, which is selectable and typically set in the range of seconds.

Figure 6:
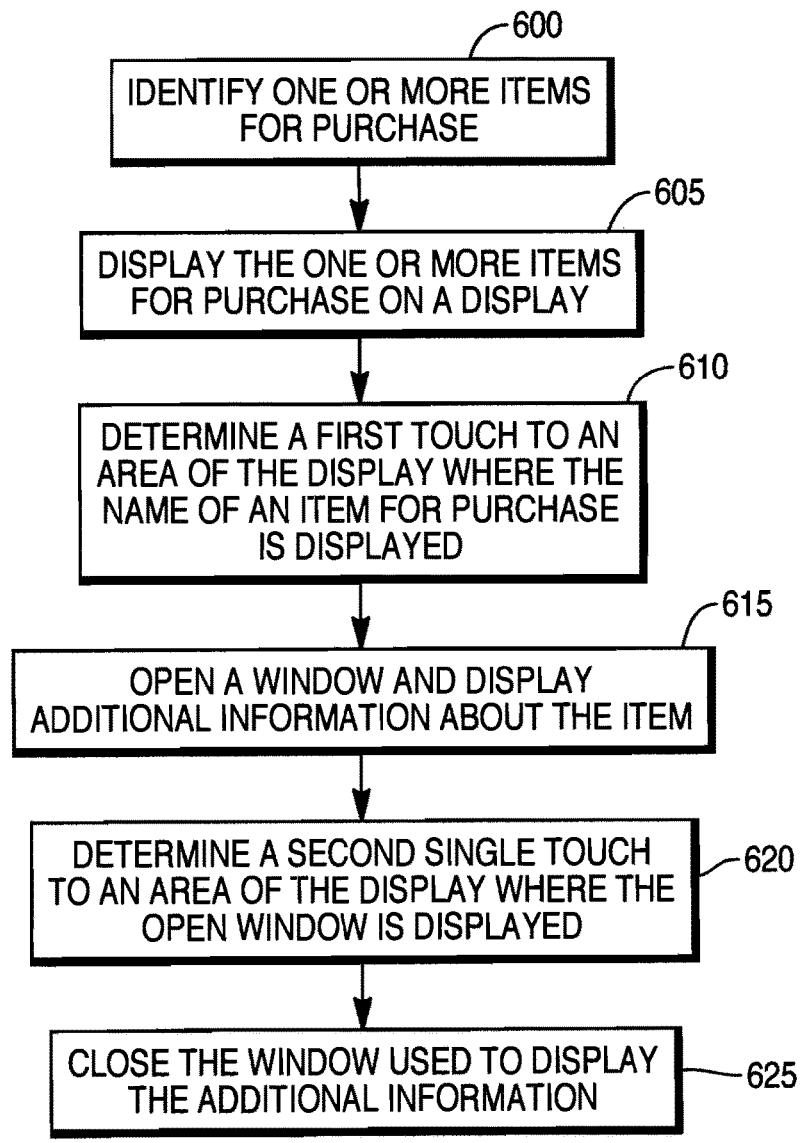
FIG. 6 is a high-level flow chart depicting an exemplary method of implementing a command to display additional information about an item.

Turning to FIG. 6, there is provided a high-level flow chart depicting an exemplary method of entering a command to display additional information about an item. In step 600, terminal 105 identifies one or more items that are presented to the terminal 105 for purchase. As each of the one or more items is identified, basic information about the item is displayed on the display 150 (step 605). In step 610, the terminal 105 determines, by receiving touch information from the touch-screen 153, that a first single touch has been made to a location on the display 150. The terminal 105 further determines a context for the touch by determine that the location of the touch is in the area of the display 150 where the name of one of the one or more items for purchase is displayed. In step 615 and in response to the first single touch and its context, the terminal 105 selects the touched item and opens a window on the display 150. The terminal 105 then displays additional information about the touched item in the newly opened window. In step 620, the terminal 105 determines, by receiving touch information from the touch-screen 153 that a second single touch has been made to a location on the display 150 and within the opened window. In step 625, the terminal 105 in response to the second single touch and its context closes the window used to display the additional information about the selected item.

Figure 7:
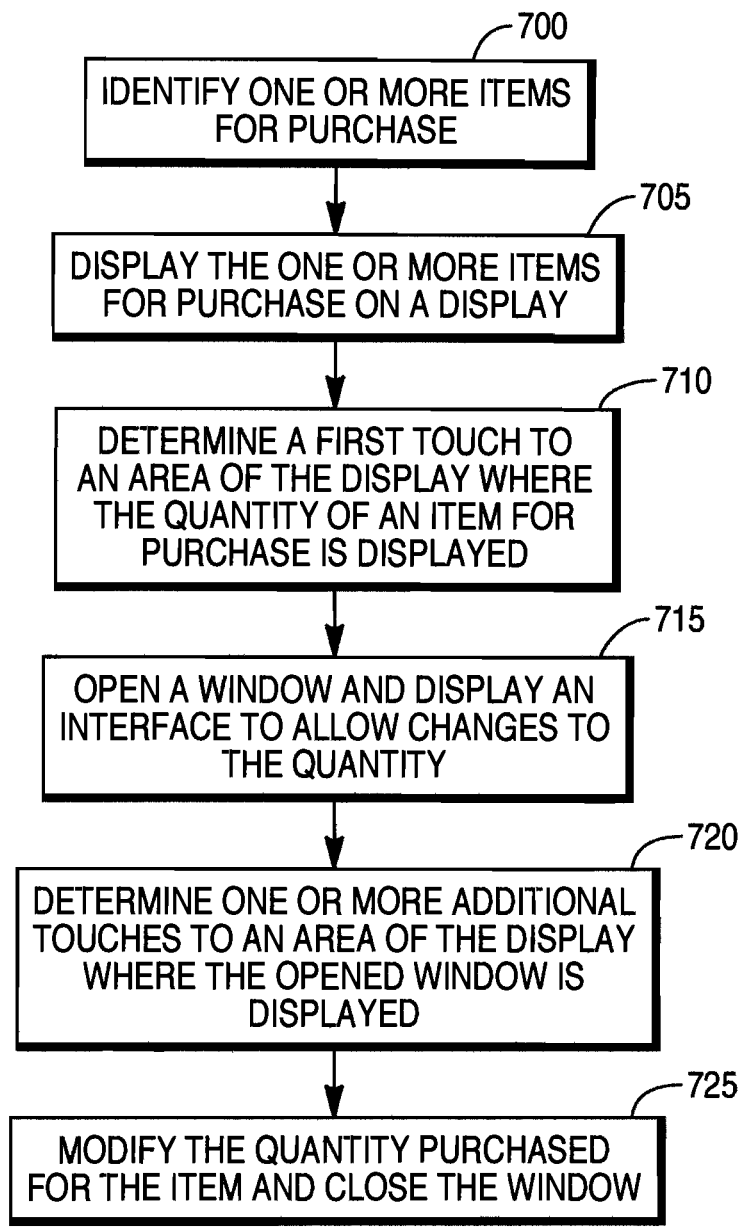
FIG. 7 is a high-level flow chart depicting an exemplary method of implementing a command to modify information about an item.

Turning to FIG. 7, there is provided a high-level flow chart depicting an exemplary method of entering a command to modify information about an item. In step 700, terminal 105 identifies one or more items that are presented to the terminal 105 for purchase. As each of the one or more items is identified, basic information about the item is displayed on the display 150 (step 705). In step 710, the terminal 105 determines, by receiving touch information from the touch-screen 153, that a first single touch has been made to a location on the display 150. The terminal 105 further determines a context for the touch by determine that the location of the touch is in the area of the display 150 where a quantity for one of the one or more items for purchase is displayed. In step 715 and in response to the first single touch and its context, the terminal 105 selects the touched item and opens a window 350 on the display 150. The terminal 105 then displays in the open window 350 an interface that allows a user to change the quantity value for the selected item.

In some embodiments, the interface includes a virtual key pad 355 and command buttons that control the operation of the virtual key pad 355. The user touches the desired key or keys of the virtual key pad 355 to select the new quantity and then touches an enter command button 360 to request that the quantity be changed.

In step 720, the terminal 105 determines, by receiving touch information from the touch-screen 153, that one or more additional touches are made to an area of the display 150. The terminal 105 further determines a context for each of the one or more additional touches by determining the location of each touch is in the area of the display 150 where the interface in the opened window 350 is displayed. The terminal 105 further determines, from the one or more additional touches and their context, a new quantity for the item and a request to enter the new quantity. In step 725 and in response to receiving the additional touches, the terminal 105 modifies the quantity purchased value for the selected item, updates the quantity information for the item displayed on the display 150 and closes the opened window 350.

Figure 8:
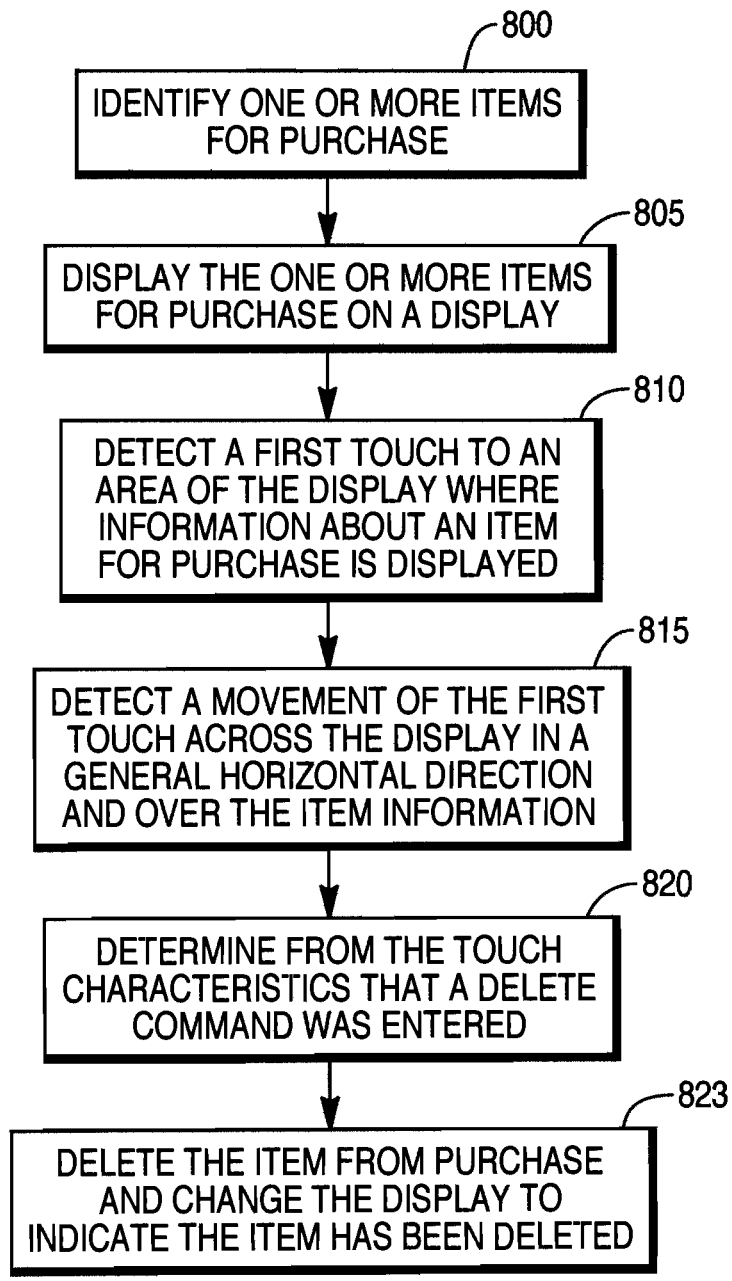
FIG. 8 is a high-level flow chart depicting an exemplary method of implementing a command to void an item from a purchase transaction.

Turning to FIG. 8, there is provided a high-level flow chart depicting an exemplary method of entering a command to delete or void an item from a purchase. In step 800, terminal 105 identifies one or more items that are presented to the terminal 105 for purchase. As each of the one or more items is identified, basic information about the item is displayed on the display 150 (step 805). In step 810, the terminal 105 determines, by receiving touch information from the touch-screen 153, that a first touch has been made to an area of the display 150. In step 815, the terminal 105 determines that the first touch is a complex touch by determining that first touch moves across the display 150 in a general horizontal direction and slightly upward direction. The terminal 105 further determines a context for the touch by determining that the touch moves across an area of the display 150 where information about one of the one or more items for purchase is displayed. In step 820, the terminal 105 determines from the context and characteristics of the touch that a delete or void item command was entered by a user on the display 150 for the one of the one or more items. In step 825, the terminal 105 deletes the one of the one or more items from the purchase and changes the information displayed for the one of the one or more items to indicate it has been deleted.

In some embodiments, between steps 820 and 825, the terminal 105 performs the step of examining secondary characteristics of the touch and determining that either the level of confidence for taking the delete action is low or the level of experience for entering the action is low. As a result of either determination, the terminal 105 opens a window and displays information requesting the user to confirm that they are requesting to delete an item from the purchase. If the user confirms the delete request, the terminal 105 proceeds to step 825. Otherwise, the terminal 105 ends the operation without deleting the item. Determining the level of confidence or experience includes comparing the secondary characteristics of velocity and consistency of the touch movement to predetermined values. If one or both fall below the preset values the level confidence or experience is determined to be low.

In some embodiments, the terminal 105 determines a multiple levels of confidence or experience and provides different levels of help or training to the user.

Figure 9:
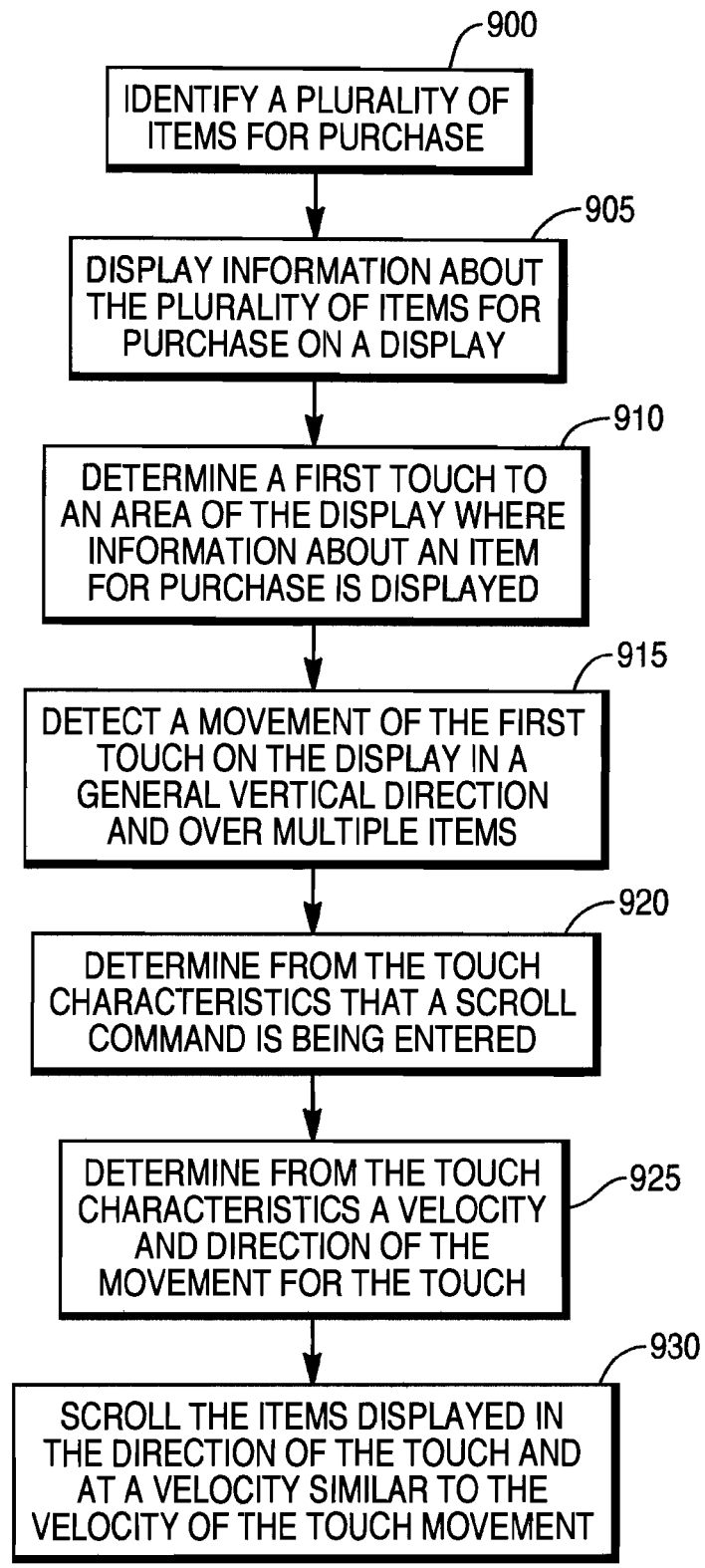
FIG. 9 is a high-level flow chart depicting an exemplary method of implementing a command to scroll displayed items for a purchase on the display.

Turning to FIG. 9, there is provided a high-level flow chart depicting an exemplary method of receiving a command to scroll items for a purchase on the display. An area of the display 150 called the item display area 585 is reserved for displaying item information. The item display area 585 can display information for only a fixed number of items for purchase. Once this limit is reached, not all items for purchase can be displayed at the same time. To view items not displayed requires scrolling one or more items that are displayed off the display 150 and replacing them by scrolling items that were not displayed onto the display 150.

In step 900, terminal 105 identifies a plurality of items that are presented to the terminal 105 for purchase. As each of the plurality of items is identified, basic information about each item is displayed on the display 150 (step 905). In step 910, the terminal 105 determines, by receiving touch information from the touch-screen 153, that a first touch has been made to an area of the display 150. In step 915, the terminal 105 determines that the first touch is a complex touch by determining that first touch moves on the display 150 in a general vertical direction. The terminal 105 further determines a context for the touch by determining that the touch moves in the item display area 585 of the display 150 where information about the plurality of items for purchase is displayed. In addition, the terminal 105 determines that the touch moves over multiple items. At step 920, the terminal 105 determines from the context and the characteristics of the touch that a scroll item command is being entered. At step 925, the terminal 105 further determines from the touch characteristics the velocity and direction of the touch movement. In step 930, the terminal 105 scrolls the items displayed in the direction of the touch movement and at a velocity similar to the velocity of the touch movement. Further, as items are scrolled off the display 150 other items in the plurality of items are scrolled onto the display 150. The items will stop scrolling if the end of the plurality of items is reached.

The above examples describe certain touch actions that are used to implement desired functions on the terminal 105. It should be understood that variations in a touch action used to select a function are possible and within the scope of this invention. The touch actions provided in the examples are not meant to limit the types of touch actions used to implement a desired function but instead they are provided to illustrate the capability of the invention.

Although particular reference has been made to a self-service POS terminal and examples have been provided illustrating the invention, certain other embodiments, variations and modifications are also envisioned within the spirit and scope of the claims that follow. It is also envisioned that the invention includes assisted service POS terminals where an operator processes a transaction for a customer and kiosk terminals.

I claim:

1. An electronic kiosk terminal comprising:
   a processor;
   a memory configured to store data and instructions where the instructions when executed by the processor generate features and functions of the terminal;
   a display adapted to display both graphical and textual information on a display surface;
   a touch input device proximate to the display surface of the display where the touch input device is adapted to generate a plurality of touch location data when the surface of the touch input device is touched where each of the plurality of touch location data includes a location on the touch input device being contacted as the touch moves across the touch input device; and
   a touch identification module adapted to receive the plurality of touch location data for a touch from the touch input device and to determine from the touch location data characteristics of the touch including the location of the touch, duration of the touch, distance the touch moved, direction of movement and speed of movement and to determine a context for the touch and is further adapted to determine, using at least one characteristic of the touch and the context for the touch, that the touch represents a request to perform a first function provided by the terminal, and wherein the first function is changed to a different function that is performed when a different characteristic associated with the touch identifies a level of confidence for a user operating the terminal that necessitates the different function on behalf of the user, and wherein the first function and the different function have different settings that the touch identification module is configured to process to determine whether to ignore different touches as being accidental touches, and wherein the first function voids an item depicted within the context when a continuous touch within the context over an area of the display where information for the item is being displayed and that moves in an upward or downward direction over the area while moving from a right or a left direction over the area and is released within the context and in response thereto the first function draws two horizontal lines through the information on the display indicating that the item has been voided, and wherein the first function causes displaying of item information when the touch is made on a description field for the item by displaying a descriptive name for the item, size and package information for the item, an ingredient list for the item, warnings for the item, and calorie information for the item, and wherein the first function permits a window that displays the item information to be custom moved from an initial location to a different location when the touch is maintained within the window and moved to the different location of the display with release of the touch at the different location, and wherein the first function permits scrolling of displayed items in an item touch area when the touch is made in the item touch area, maintains contact and is moved upward or downward.

2. The terminal of claim 1, where the characteristics of the touch are grouped into a primary or secondary set of touch characteristics.

3. The terminal of claim 2, where the primary characteristics of the touch include a starting point and direction of the touch.

4. The terminal of claim 2, where the secondary characteristics of the touch include the velocity of the touch.

5. The terminal of claim 3, where only primary characteristics of the touch are used to determine that the touch represents a request to perform the first function.

6. The terminal of claim 5, where the first function is performed by the terminal in response to the touch.

7. The terminal of claim 6, where performing the first function includes displaying on the display different initial responses which are determined by secondary characteristics of the touch.

8. The terminal of claim 4, where the touch identification module is further adapted to determine the level of confidence for the request to perform the first function using secondary characteristics of the touch.

9. The terminal of claim 8, where the touch identification module is further adapted to determine a level of help for the touch using the determined level of confidence.

10. The terminal of claim 9, where the touch identification module determines a level of help for each touch made to the touch input device.

11. The terminal of claim 10, where performing the first function includes displaying on the display different initial responses determined by the level of help for the touch.

12. The terminal of claim 1, where the context of the touch includes data about the graphical and textual information being displayed on the display surface under or proximate to the touch.

13. The terminal of claim 12, where performing the first function includes displaying different responses that correspond to different graphical and textual information being displayed under or proximate to the first touch.

14. A user interface method implemented on an electronic kiosk terminal by a processor in the terminal, the method comprising:
    displaying information about one or more items on a display located on the kiosk terminal;
    receiving touch position data from a touch input device proximate to the display where the touch position data includes data identifying a plurality of locations on the touch input device that were touched;
    processing only the touch position data to determine behavior characteristics for the touch where the behavior characteristics including a starting location, path traveled, length of path, direction of path and velocity of movement and where the behavior characteristics are classified as primary or secondary behavior characteristics;
    determining a context of the touch using one or more behavior characteristics of the touch where determining the context includes determine the information being displayed on the display in the area under or proximate to the touch;
    mapping the touch, using the context and one or more of the primary behavior characteristics, to one of a plurality of functions provided by the user interface; and
    implementing the mapped function, and changing the mapped function to a different one of the plurality of functions when a different characteristic associated with the touch indicates a level of confidence for a user operating the terminal that necessitates the different one of the plurality of functions on behalf of the user, and wherein implementing further includes processing different settings for the mapped function and the plurality of functions for determining when to ignore different touches as being accidental touches, and voiding a particular item presented within the display in response to implementing the mapped function when the touch position data indicates a particular movement over the area of the display where the information for the item is being displayed and that is in an upward or a downward direction over the area and is made in a right or left direction over the area and is released within the context of the particular item presented within the display and in response thereto the mapped function draws two horizontal lines through the information on the display indicating that the particular item has been voided, and displaying a descriptive name for the first item, size and package information for the item, an ingredient list for the item, warnings for the item, and calorie information for the item in response to implementing the mapped function when the touch position data identifies a selection of an item description field for the item, and moving a window that displays the information for the item to be custom moved from an initial location to a different location when the touch position data is maintained within the window and moved to the different location of the display with a release of the touch position data at the different location, and scrolling displayed items in an item touch area when the touch position data is made in the item touch area, maintains contact, and is moved upward or downward.

15. The method of claim 14, where the primary behavior characteristics of the touch include the starting location and direction of path.

16. The method of claim 15, where the secondary behavior characteristics of the touch include the velocity of movement.

17. The method of claim 16, where implementing the mapped function includes displaying on the display different initial responses which are determined by the secondary behavior characteristics of the touch.

18. The method of claim 14, further including determining a level of help for the touch using the behavior characteristics to determine the level of confidence for the touch.

19. The method of claim 18, where implementing the mapped function includes displaying on the display different initial responses based on the determined level of help for the touch.

20. The method of claim 14, where behavior characteristics for the touch includes identifying a single or double touch to the display that does not involve substantial movement of the touch.

21. The method of claim 14, wherein:
    displaying information includes displaying a name for each of the one or more items;
    determining the context includes determining that the name for a first item of the one or more items is being displayed on the display in the area under or proximate to the touch;
    determining the behavior characteristics includes determining that a single touch occurred; and
    mapping the touch to a function includes mapping the touch to a function that displays additional information about the first item.

22. A system comprising:
    a computer data network;
    a computer server connected to the network; and
    an electronic kiosk terminal, in a generally fixed location, connected to the network and operable to communication with the computer server using the network, the electronic kiosk terminal comprising:
    a processor;
        a network communication controller operable to communicate with the network;
        a memory configured to store data and instructions where the instructions when executed by the processor generate the features and functions of the terminal;
        a display adapted to display both graphical and textual information on a display surface;
        a touch input device proximate to the display surface of the display where the touch input device is adapted to generate a plurality of touch location data when the surface of the touch input device is touched where each of the plurality of touch location data includes a location on the touch input device being contacted as the touch moves across the touch input device; and
        a touch identification module adapted to receive the plurality of touch location data for a touch from the touch input device and to determine from the touch location data characteristics of the touch including the location of the touch, duration of the touch, distance the touch moved, direction of movement and speed of movement and to determine a context for the touch and is further adapted to determine, using at least one characteristic of the touch and the context for the touch, that the touch represents a request to perform a first function provided by the terminal, and wherein the first function is changed to a different function that is performed when a different characteristic associated with the touch identifies a level of confidence for a user operating the terminal that necessitates the different function on behalf of the user, and wherein the first function and the different function have different settings that the touch identification module is configured to process to determine whether to ignore different touches as being accidental touches, and wherein the first function voids an item depicted within the context when a continuous touch within the context over an area of the display where information for the item is being displayed and moves in an upward or downward direction over the area while moving from a right or a left direction over the area and is released within the context and in response thereto the first function draws two horizontal lines through the information on the display indicating that the item has been voided, and wherein the first function displays a descriptive name for the item, size and package information for the item, an ingredient list for the item, warnings for the item, and calorie information for the item when touch position data identifies a selection on a description field for the item, and wherein the first function permits a window that displays the information for the item to be custom moved from an initial location to a different location when the touch position data is maintained within the window and custom moved to the different location of the display with a release of the touch position data, and wherein the first function permits scrolling of displayed items in an item touch area when the touch position data is made in the item touch area that maintains contact while moving upward or downward.

23. A non-transitory computer hardware storage medium comprising instructions that when executed by a processor cause the processor to:
display information about one or more items on a display;
receive touch position data from a touch input device proximate to the display where the touch position data includes data identifying a plurality of locations on the touch input device that were touched as the touch moved across the touch input device;
process only the touch position data to determine behavior characteristics for the touch where the behavior characteristics including a starting location, path traveled, length of path, direction of path and velocity of movement and where the behavior characteristics are classified as primary or secondary behavior characteristics;
determine a context of the touch using one or more behavior characteristics of the touch where the determining the context includes determine the information being displayed on the display in the area under or proximate to the touch;
map the touch, using the context and one or more of the primary behavior characteristics, to one of a plurality of functions provided by the user interface, and change the mapped function to a different one of the plurality of functions when a different characteristic associated with the touch indicates a level of confidence for a user operating the terminal that necessitates the different one of the plurality of functions; and
implement the mapped function, and wherein implementing further includes processing different settings for the mapped function and the plurality of functions for determining when to ignore different touches as being accidental touches, and void a particular item presented within the display in response to implementing the mapped function when the touch position data indicates a particular movement that is in an upward or a downward direction over the area of the display where the information for the item is being displayed and is made in a right or left direction over the area and is released within the context of the particular item presented within the display and in response thereto the first function draws two horizontal lines through the information on the display indicating that the particular item has been voided, and displaying a descriptive name for the item, size and package information for item, an ingredient list for the item, warnings for the item, and calorie information for the item in response to implementing the mapped function when the touch position data identifies a selection of an item description field for the item, and move a window that displays the information for the item from an initial location to a different location when the touch position data is maintained within the window and custom moved to the different location of the display with a release of the touch position data at the different location, and scroll displayed items in an item touch area when the touch position data is made in the item touch area, maintains contact, and is moved upward or downward.

* * * * *